(12) United States Patent  
Obaidi

(10) Patent No.: US 11,937,149 B2  
(45) Date of Patent: Mar. 19, 2024

(54) WEAPON MANAGER

(71) Applicant: T-Mobile USA, Inc., Bellevue, WA (US)

(72) Inventor: Ahmad Arash Obaidi, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/846,410

(22) Filed: Jun. 22, 2022

(65) Prior Publication Data

US 2022/0337976 A1 Oct. 20, 2022

Related U.S. Application Data

(63) Continuation of application No. 17/114,420, filed on Dec. 7, 2020, now Pat. No. 11,405,754.

(51) Int. Cl.
| | |
|---|---|
| *H04W 4/029* | (2018.01) |
| *F41A 17/06* | (2006.01) |
| *H04W 4/02* | (2018.01) |
| *H04W 4/12* | (2009.01) |
| *H04W 4/38* | (2018.01) |
| *H04W 4/90* | (2018.01) |

(52) U.S. Cl.  
CPC .......... *H04W 4/029* (2018.02); *F41A 17/063* (2013.01); *H04W 4/025* (2013.01); *H04W 4/12* (2013.01); *H04W 4/38* (2018.02); *H04W 4/90* (2018.02)

(58) Field of Classification Search  
CPC ......... H04W 4/029; H04W 4/38; H04W 4/90; H04W 4/025; H04W 4/12; F41A 17/063  
See application file for complete search history.

(56) References Cited

U.S. PATENT DOCUMENTS

| | | | |
|---|---|---|---|
| 8,850,944 B2 | 10/2014 | Zhou | |
| 8,966,797 B2 | 3/2015 | Carlson | |
| 9,435,597 B2 | 9/2016 | Goren et al. | |
| 10,102,732 B2 | 10/2018 | Gersten | |
| 2012/0021759 A1* | 1/2012 | Chen | H04W 4/02 455/456.1 |
| 2014/0157646 A1* | 6/2014 | McHale | F41A 17/08 42/119 |
| 2014/0164921 A1* | 6/2014 | Salinas | G06F 16/29 715/716 |

(Continued)

OTHER PUBLICATIONS

U.S. Appl. No. 17/144,420, Notice of Allowance dated Mar. 25, 2022, 43 pages.

(Continued)

*Primary Examiner* — Ernest G Tacsik

(57) ABSTRACT

Methods, systems, and apparatus, including computer programs encoded on a computer storage medium, for implementing a weapon manager are disclosed. In one aspect, a method includes the actions of determining, by the server, that the weapon is in a particular location. The actions further include determining, by the server, a projected travel path of the weapon. The actions further include, based on determining that the weapon is in a particular location and the projected travel path of the weapon, generating, by the server, an instruction to disable the weapon. The actions further include providing, for output to the weapon, the instruction to disable the weapon.

20 Claims, 7 Drawing Sheets

(56) References Cited

U.S. PATENT DOCUMENTS

| | | |
|---|---|---|
| 2014/0173962 A1 | 6/2014 | Goren et al. |
| 2014/0259841 A1* | 9/2014 | Carlson .................. F41A 17/08 |
| | | 42/70.11 |
| 2014/0366422 A1 | 12/2014 | Henry |
| 2014/0378088 A1* | 12/2014 | Goel ..................... H04W 4/029 |
| | | 455/404.2 |
| 2016/0187088 A1 | 6/2016 | Milde, Jr. |
| 2016/0196628 A1 | 7/2016 | Crowley et al. |
| 2017/0051993 A1* | 2/2017 | Imbriano ................ F41A 19/01 |
| 2017/0146319 A1 | 5/2017 | Lyren |
| 2017/0176123 A1* | 6/2017 | Milde, Jr. ............... F41A 17/08 |
| 2017/0286654 A1* | 10/2017 | Nicoll .................... F41A 17/08 |
| 2020/0368616 A1 | 11/2020 | Delamont |
| 2021/0080208 A1 | 3/2021 | Wu et al. |
| 2021/0183249 A1* | 6/2021 | Beauchamp .......... G01S 19/393 |

OTHER PUBLICATIONS

U.S. Appl. No. 17/144,420, Office Action dated Dec. 10, 2021, 69 pages.

\* cited by examiner

400

```
┌─────────────────────────────────────────────────────────┐
│  Determine that a weapon is in a particular location    │
│                                                    410  │
└─────────────────────────────────────────────────────────┘
                            ↓
┌─────────────────────────────────────────────────────────┐
│  Determine a projected travel path of the weapon        │
│                                                    420  │
└─────────────────────────────────────────────────────────┘
                            ↓
┌─────────────────────────────────────────────────────────┐
│  Based on determining that the weapon is in a particular│
│  location and the projected travel path of the weapon,  │
│  generate an instruction to disable the weapon          │
│                                                    430  │
└─────────────────────────────────────────────────────────┘
                            ↓
┌─────────────────────────────────────────────────────────┐
│  Provide, for output to the weapon, the instruction to  │
│  disable the weapon                                     │
│                                                    440  │
└─────────────────────────────────────────────────────────┘
```

FIG. 4

WEAPON MANAGER

CROSS-REFERENCE TO RELATED APPLICATION

This application is a continuation of U.S. application Ser. No. 17/114,420, filed Dec. 7, 2020, which is incorporated by reference.

BACKGROUND

A weapon is any implement or device that can be used with intent to inflict damage or harm. A firearm may be a weapon that is designed to launch projectiles. Some firearms may be equipped with safety switch that, when engaged, prevents the trigger of the firearm from moving.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 4 is a flowchart of an example process for disabling a weapon based on the location of the weapon.

DETAILED DESCRIPTION

Weapon safety is an important aspect of owning and operating a weapon and for any of those in the vicinity of a weapon. Weapon owners and users may attempt to keep a weapon secured using any combination of a safe, holster, sheath, safety switch, or other safety mechanism. Even with the presence of safety mechanisms, there may be locations where the presence of a weapon may cause a threat such that the appropriate course of action is to disable the weapon. Disabling a weapon may include locking the sheath, engaging the safety switch, or any other similar technique. In some instances, safety switches may be electronically engaged.

In order to determine the location of a weapon, the weapon may include an electronic device that is configured to communicate with a wireless network. The wireless network may track the movements of the weapon and store data indicating the past movements of the weapon, the current travel path of the weapon, and the current location of the weapon. The wireless network may also determine a likely future travel path of the weapon. Based on those factors, the wireless network may determine whether to disable the weapon. If the wireless network determines to disable the weapon, then the wireless network may transmit an instruction to the weapon to engage a safety mechanism such as an electronically actuated safety. The weapon may then be disabled.

In addition to disabling the weapon, the wireless network may alert any users in the vicinity of the weapon. Upon determining the current location of the weapon and/or the likely future travel path of the weapon, the wireless network may identify the users who are in the vicinity of the weapon and/or near the likely future travel path of the weapon. The wireless network may transmit a notification indicating the location of the weapon and whether the weapon was successful disabled. Some users may wish to receive notifications when a weapon is in a particular location, even if those users are not at the particular location. The wireless network may identify the users who elected to receive notification for the current location of the weapon and transmit a notification indicating the location of the weapon and whether the weapon was successful disabled.

Figure 1:
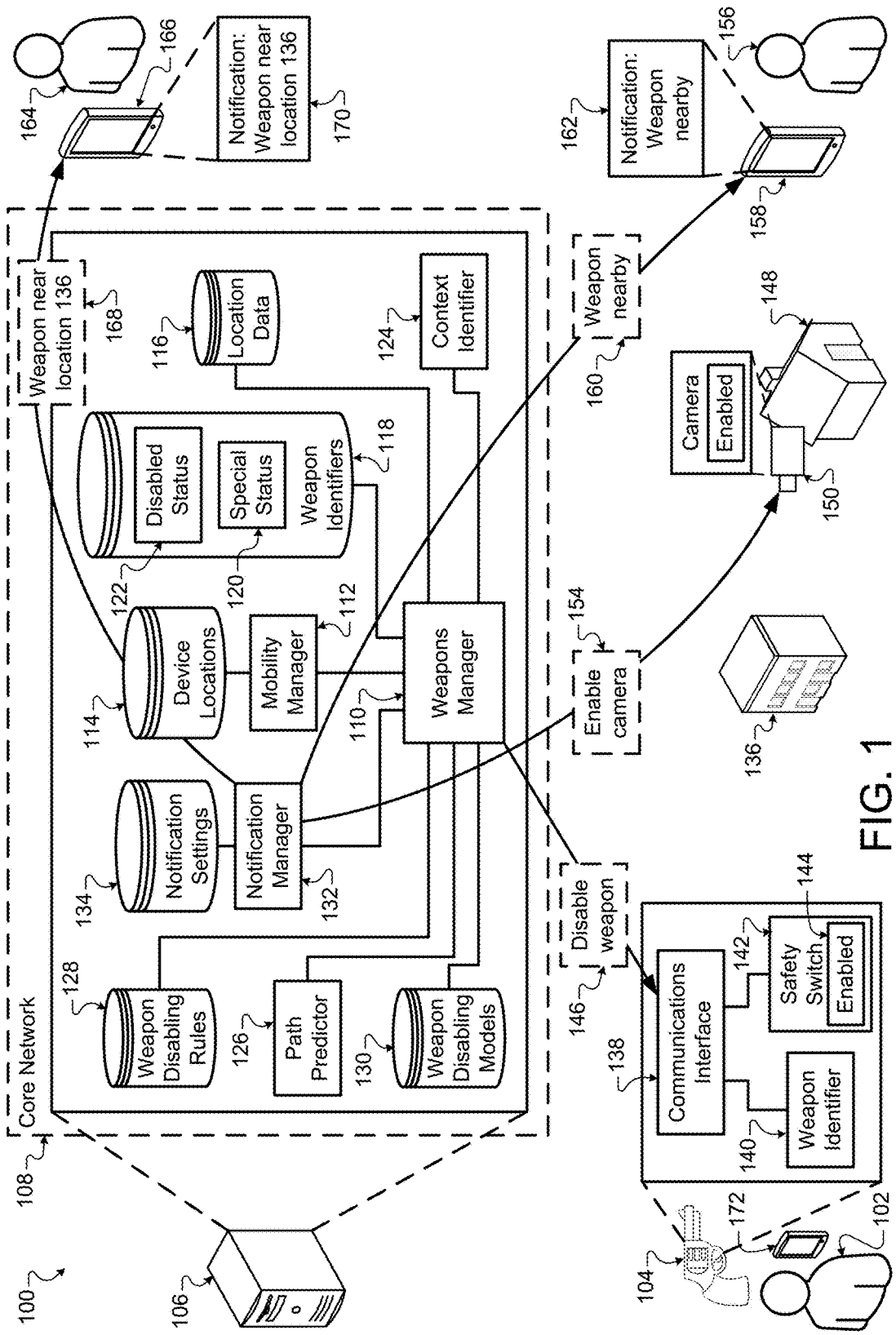
FIG. 1 illustrates an example system that is configured to disable a weapon based on the location of the weapon.

FIG. 1 illustrates an example system 100 that is configured to disable a weapon 104 based on the location of the weapon 104. Briefly, and as described in more detail below, the system 100 includes a server 106 that is configured to communicate with the weapon 104, the computing devices 158 and 166, and the camera 150. The server 106 is able to determine the location of the weapon 104. Based on the location of the weapon 104, the server 106 is able to determine whether to disable the weapon 104, activate the camera 150, and/or provide a notification to the computing devices 158 and/or 166.

In more detail, the user 102 may be carrying the weapon 104. As the user 102 and the weapon 104 move, the server 106 monitors the location of the weapon 104. In some instances, the weapon 104 may approach an area with heightened security measures such as a school 136. The server 106 may use several different factors, weapon disabling rules 128, and/or weapon disabling models 130 to determine whether to disable the weapon 104. The factors may include the predicted path of the weapon 104, the current context, whether the weapon 104 has any special status (e.g., a law enforcement weapon), and/or any similar factors. The weapon disabling rules 128 may specify a threshold distance from the school 136 that the weapon 104 may remain enabled. The weapon disabling models 130 may identify situations where the weapon 104 should be disabled that the weapon disabling rules 128 does not specify.

Based on the location of the weapon 104 and the additional factors, the server 106 may generate additional notifications and instructions in addition to the adjustment command 146. The server 106 may generate and transmit a notification to those users who are in the vicinity of the weapon 104. The server 106 may generate and transmit a notification to those users who have requested to receive notifications when a weapon is in the vicinity of the school 136. The server 106 may identify cameras and/or microphones in the vicinity of the school 136 and the weapon 104. If the identified cameras and/or microphones are configured to receive instructions from the server 106, then the server 106 may generate and transmit an instruction to the cameras and/or microphones to begin capturing audio and/or video.

The server 106 may be able to communicate with the weapon 104 because the weapon 104 may include a communications interface 138. The communications interface 138 may include a cellular radio that is configured to communicate with a wireless carrier network. In some implementations, the communications interface 138 may also include a Wi-Fi radio, a short-range radio, and/or any other similar interfaces. The communications interface 138 may be built into the weapon 104 at the time of manufacturer, added by the gun dealer or may be an accessory that the user 102 can add to the weapon 104. The communications interface 138 may include an embedded SIM (eSIM) and/or a removable SIM such as a nano SIM. At the time of purchase of the weapon 104 or the accessory, the communications interface 138 may be provisioned so that the server 106 may communicate with the weapon 104 through the communications interface 138.

The server 106 may include a mobility manager 112 that is configured to monitor the location of the weapon 104 or another computing device that is connected to the server 106 through a wireless base station such as a gNodeB or any other type of access point. The location of the weapon 104 or other computing device may include the location of the wireless base station to which the weapon 104 or other computing device is connected and/or GPS data received from the weapon 104 in cases where the weapon 104 includes a GPS receiver. The mobility manager 112 may store the location data in the device locations 114 of the server 106.

In some implementations, the mobility manager 112 may determine the location of the weapon 104 at periodic intervals, such as every five seconds. In some implementations, the mobility manager 112 may determine the location of the weapon 104 when the weapon 104 connects to a different wireless base station and/or provides updated GPS data. In some implementations, the mobility manager 112 may determine the location of the weapon 104 relative to the base station with which the weapon 104 is communicating. In this case, the mobility manager 112 may determine the relative location based on data collected from the base station such as signal strength and direction of communications between the weapon 104 and the base station. The mobility manager 112 may also determine the relative location based on the location of the base station and GPS data received from the weapon 104. The relative location data may include a distance between the weapon 104 and the base station, the cardinal direction from the base station to the weapon 104, and/or any other similar measurements.

The server 106 may include a weapons manager 110. The weapons manager 110 may be configured to monitor the weapon 104 and determine whether to disable the weapon 104. The weapons manager 110 may determine other actions to take based on the status of the weapon 104. The other actions may include generating and transmitting instructions to enable the weapon 104, generating and transmitting notification to other computing devices, generating and transmitting instructions to other computing devices, and/or any other similar actions. The weapons manager 110 may be configured to monitor and manage multiple weapons including the weapon 104. The weapons manager 110 may be configured to manage different types of weapons that include a communications interface integrated into the weapon and/or added as an accessory.

The weapons manager 110 may access location data 116 that identifies locations of buildings and/or entities that occupy buildings at various locations. The location data 116 may include data that relates a building to a GPS coordinate and/or another location identifier. The location data 116 may also include data that relates an entity to a GPS coordinate and/or another location identifier. For example, the location data 116 may relate location 136 to a GPS coordinate and indicate that a school is located at that GPS coordinate. In some implementations, the location data 116 may include classification data for the type of building and/or entity at each location. Some of the classifications for buildings may include residential building, commercial building, industrial building, government building, and/or any other similar classification. Some additional classifications may include school, restaurant, theater, office, warehouse, apartment, grocery store, stadium, bar, bank, and/or any other similar classification. The location data 116 may include data identifying the entity at the location. The data identifying the entity may include a name of a business or businesses that occupy each location and/or the type of business that occupy each location. The type of business may include restaurant, bank, clothing store, department store, and/or any other type of business.

In some implementations, the server 106 may analyze mapping data that is accessible by the server 106. The server 106 may update the location data 116 based on analyzing the mapping data. The mapping data may be located on an additional server to which the server 106 is able to communicate. The server 106 may update the location data 116 at periodic intervals, such as once per day.

In some implementations, the server 106 may not include the location data 116. In this case, the server 106 may request mapping data from an additional server in response to the weapons manager 110 and/or the mobility manager 112 determining that the weapon 104 is at a new location or moving. The weapons manager 110 may request data indicating what building and/or entity is at the location of the weapon 104, along a predicted path of the weapon 104, and/or within a threshold distance of the location of the weapon 104. While the weapon 104 is moving, the server 106 may continuously, or periodically, request mapping data. If the weapon 104 is stationary, then the server 106 may request mapping data in response to detecting movement of the weapon 104.

The weapons manager 110 may communicate with the context identifier 124 to determine the context related to the weapon 104. The context may include data related to the identity of a registered owner of the weapon 104, any criminal history of the registered owner, the time, the date, the type of weapon 104, the history of the weapon 104, the purchase date of the weapon 104, and/or any other similar details. The history of the weapon 104 may include previous movements of the weapon 104, the number of times and locations of where the weapon 104 was discharged, the identity of previous owners of the weapon 104, etc. The context may also include data related to the weather and current events.

In some implementations, the weapons manager 110 may determine that the movement of the weapon 104 is correlated with another computing device, such as computing device 172. This computing device 172 may be moving in a similar pattern as the weapon 104 and stopping at approximately the same locations. In this case, the weapons manager 110 may determine that a user of the computing device 172 is carrying the weapon 104. The weapons manager 110 may access historical movements of the computing device 172 by communicating with the mobility manager 112. The weapons manager 110 may request context data related to the registered owner or the user of the computing device. The context data may include registered weapons of the user, the history of those registered weapons, any criminal history of the user, the purchase date of those weapons, and/or any other similar details.

The weapons manager 110 may access the weapons identifiers 118. The weapons identifiers 118 may store data related to the weapons that the weapons manager 110 is able to monitor and remotely enable and disable. The stored data may include unique identifiers for each of the weapons. Each weapon may store a matching unique identifier. The weapons manager 110 may assign the weapon identifier at the time of purchase and/or during provisioning. For example, the weapons manager 110 may assign the unique weapon identifier 140 to the weapon 104 during provisioning. The weapon 104 may store the weapon identifier 140 locally on the weapon 104. In some instances, the weapon identifier 140 may include the serial number of the weapon 104 and the model of the weapon 104. The weapons manager 110 may store a matching weapon identifier in the weapons identifiers 118.

The weapons identifiers 118 may include a disabled status 122 for each weapon identifier. If the weapons manager 110 transmits an instruction to disable a weapon, then the weapons manager 110 may indicate that the disabled status 122 of the weapon is "disabled." If the weapons manager 110 transmits an instruction to enable a weapon, then the weapons manager 110 may indicate that the disabled status 122 of the weapon is "enabled." In some implementations, the weapons manager 110 may update the disabled status 122 after receiving confirmation from the weapon 104. For example, the weapons manager 110 transmits an instruction to disable the weapon 104. The weapon 104 receives the instruction, disables the weapon 104, and transmits a confirmation indicating that the weapon 104 is disabled. The weapons manager 110 receives the confirmation and updates the disabled status 122.

In some implementations, the weapons manager 110 may instruct the weapon 104 to disable for a particular period of time and/or while the weapon 104 is in a particular location. In this case, the weapon 104 may transmit a confirmation in response to the instruction and a confirmation when the weapon 104 leaves the particular location and/or the particular period of time has elapsed. For example, the weapons manager 110 may instruct the weapon 104 to disable for one hour. The weapon 104 may receive this instruction and disable the weapon 104. The weapon 104 may transmit a confirmation indicating compliance with the instruction to the weapons manager 110. The weapons manager 110 may update the disable status 122 for the weapon 104. After an hour, the weapon 104 may enable and transmit data to the weapons manager 110 indicating that the weapon 104 is enabled. The weapon manager 110 may update the disable status 122 for the weapon 104. In some implementations, the weapons manager 110 may monitor when the hour has elapsed and transmit the instruction to the weapon 104 to disable. In this case, the weapons manager 110 may not initially transmit an instruction to the weapon 104 to disable for one hour. Instead, the instruction may be to disable without any indication of time.

The weapon identifiers 118 may include a special status 120 for each weapon identifier. The special status 120 may indicate the owner of the weapon 104, the type of owner of the weapon 104, whether the weapon 104 has been reported stolen, whether the weapon 104 was previously involved in a crime, and/or any other similar information. For example, the special status 120 may indicate that a weapon is a law enforcement weapon.

The server 106 may include a path predictor 126. The path predictor 126 is configured to receive location data of the weapon 104 and predict the future movement of the weapon 104. The path predictor 126 may receive location data determined by the mobility manager 112. The location data may identify the previous locations of the weapon 104 for the past few hours, days, weeks, or any other similar time period. The location data may identify the previous ten, twenty, or any other similar number of locations of the weapon 104. Based on the current and past location data of the weapon 104, the path predictor 126 may determine a likely future path of the weapon 104. The path predictor 126 may access mapping data and use rules and/or machine learning models to determine the likely path of the weapon 104.

In some implementations, the path predictor 126 may receive past movement data and a current location of the owner of the weapon 104 based on the past locations and current locations of a computing device of the owner of the weapon 104 that communicates with the server 106. The path predictor 126 may use the past movement data and the current location of the owner of the weapon 104 to determine the likely path of the weapon 104. In some implementations, the path predictor 126 may receive past movement data and a current location of a computing device that is configured to communicate with the server 106 and whose movement is correlated with the movement of the weapon 104.

The weapons manager 110 may use the weapon disabling rules 128 and/or the weapon disabling models 130 to determine whether to adjust the disable status of the weapon 104. The weapons manager 110 may apply the current and past locations of the weapon 104 received from the mobility manager, the location data 116, the context data received from the context identifier 124, the predicted path from the path predictor 126, the disabled status 122 of the weapon 104, and/or any special status 120 of the weapon 104 to the weapon disabling rules 128 and/or the weapon disabling models 130. Based on the output of the weapon disabling rules 128 and/or the weapon disabling models 130, the weapons manager 110 may adjust the disabled status of the weapon 104.

The weapons disabling rules 128 may include one or more rules that specify how to compare the current and past locations of the weapon 104 received from the mobility manager, the location data 116, the context data received from the context identifier 124, the predicted path from the path predictor 126, the disabled status 122 of the weapon 104, and/or any special status 120 of the weapon 104 to determine whether to enable/disable the weapon 104. An example rule may specify to disable the weapon 104 if the weapon 104 is moving in the direction of a school, the weapon 104 is not a law enforcement weapon, and the weapon is within one thousand meters of the school. Another example rule may specify to disable the weapon 104 if the weapon 104 is within one thousand meters of a school and the weapon 104 is identified as stolen. Another example rule may specify to disable the weapon 104 if the weapon 104 is within five hundred meters of a government facility, the weapon 104 is moving in the direction of the government facility, and the weapon 104 is not a law enforcement weapon. Another example rule may specify to not disable the weapon 104 if the weapon 104 is a law enforcement weapon and the weapon 104 is not stolen.

The weapon disabling models 130 may be configured to receive the current and past locations of the weapon 104 received from the mobility manager, the location data 116, the context data received from the context identifier 124, the predicted path from the path predictor 126, the disabled status 122 of the weapon 104, and/or any special status 120 of the weapon 104 and output whether the status of the weapon 104 should be enabled or disabled. The weapon disabling models 130 may be trained using machine learning and historical data. The historical data may include previous locations of weapons, previous location data, previous context data, previous predicted paths of weapons, previous disabled statuses of weapons, and/or previous special statuses of weapons.

The weapon disabling models 130 may include various models that are each configured to receive different data. For example, a model may be configured to receive current and past locations of the weapon 104, the location data 116, and the special status 120 of the weapon 104. Another model may be configured to receive the current and past locations of the weapon 104 received from the mobility manager and the predicted path from the path predictor 126. Another model may be configured to receive the context data received from the context identifier 124 and the special status 120 of the weapon 104. The weapon manager 110 may select the model that is configured to receive the data that the weapon manager 110 has received. For example, if the weapons manager 110 did not receive context data from the context identifier 124, then the weapons manager 110 may not select a model that is configured to receive context data.

In some implementations, the weapons manager 110 may use the weapon disabling models 130 in cases where the weapon disabling rules 128 do not include a rule that outputs whether to adjust the disabled status of the weapon 104. For example, if the weapons manager 110 accesses the weapons disabling rules 128, and the weapons disabling rules 128 includes a rule that specifies how to compare the current and past locations of the weapon 104 received from the mobility manager, the location data 116, the context data received from the context identifier 124, the predicted path from the path predictor 126, the disabled status 122 of the weapon 104, and/or any special status 120 of the weapon 104, then the weapons manager 110 may implement the adjustment to the disabling status output by the rule. If the weapons manager 110 accesses the weapons disabling rules 128, and the weapons disabling rules 128 do not include a rule that specifies how to compare the current and past locations of the weapon 104 received from the mobility manager, the location data 116, the context data received from the context identifier 124, the predicted path from the path predictor 126, the disabled status 122 of the weapon 104, and/or any special status 120 of the weapon 104, then the weapons manager 110 may access the weapon disabling models 130. The weapons manager 110 may select a model that is configured to receive the current and past locations of the weapon 104 received from the mobility manager, the location data 116, the context data received from the context identifier 124, the predicted path from the path predictor 126, the disabled status 122 of the weapon 104, and/or any special status 120 of the weapon 104 and implement the adjustment to the disabling status output by the model.

The weapons manager 110 may receive the adjustment to the disabling status output by the weapon disabling models 130 and/or the weapon disabling rules 128. The weapons manager 110 may generate an adjustment command 146 based on the weapon disabling models 130 and/or the weapon disabling rules 128 indicating to enable or disable the weapon 104. The weapons manager 110 may determine whether to generate the adjustment command 146 by comparing the disabling status output by the weapon disabling models 130 and/or the weapon disabling rules 128 to the current disabled status 122 of the weapon 104. If the disabling status output by the weapon disabling models 130 and/or the weapon disabling rules 128 is the same as the disabled status 122 of the weapon 104, then the weapons manager 110 may not generate an adjustment command 146. In some implementations, the weapons manager 110 may generate an adjustment command 146 (or refresh) independent of the disabled status 122 of the weapon 104.

The weapons manager 110 may transmit the adjustment command 146 to the communications interface 138 of the weapon 104. The server 106 that includes the weapons manager 110 may be included in or in communication with a network such as a wireless carrier network that provides voice and data communication services to multiple devices, such as the weapon 104, the camera 150, the computing devices 158 and 166, and other devices. The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5th Generation (5G) wireless systems, CDMA-2000 (Code Division Multiple Access 2000), and/or other similar standards. In some implementations, the server 106 may communicate with the weapon 104, the camera 150, the computing devices 158 and 166, and other devices using a Wi-Fi network, short range radio, infrared communication, and/or any other similar communication technique.

The wireless carrier network may include a radio access network and a core network 108. The radio access network may include multiple base stations. The multiple base stations are responsible for handling voice and/or data traffic between multiple subscriber devices, such as the weapon 104, the camera 150, the computing devices 158 and 166, and other devices and the core network 108. Accordingly, each of the base stations may provide a corresponding network cell that delivers telecommunication and data communication coverage. The core network 108 may use the network cells to provide communication services to the multiple subscriber devices. For example, the core network 108 may connect the multiple subscriber devices to other telecommunication and data communication networks, such as the Internet and the public switched telephone network (PSTN). The base stations are responsible handling voice and data traffic between devices and the core network 108. In some implementations, the base stations may be in the form of eNodeB nodes. Each eNodeB node may include a base transceiver system (BTS) that communicates via an antenna system over an air-link with one or more devices that are within range. The antenna system of an eNodeB node may include multiple antennas that are mounted on a radio tower to provide a coverage area that is referred to as a "cell." The BTS may send RF signals to devices and receive radio signals from devices.

The communications interface 138 of the weapon 104 may receive the adjustment command 146. The weapon 104 may include a safety switch 142 that may be configured to disable the weapon 104. The safety switch 142 may include an electrical or electro-mechanical type of switch. If the safety switch status 144 is enabled, then the weapon 104 is disabled. If the safety switch status 144 is disabled, then the weapon 104 is enabled. The safety switch 142 may not be able to be controlled by the user 102. The safety switch 142 may be able to be electronically controlled by a processor included in the weapon 104.

The weapon 104 may implement the adjustment command 146 by adjusting the safety switch 142. In some implementations, the weapon 104 may compare a weapon identifier included in the adjustment command 146 to the weapon identifier 140. If the weapon identifier included in the adjustment command 146 matches the weapon identifier 140, then the weapon 104 may implement the adjustment command 146. If the weapon identifier included in the adjustment command 146 does not match the weapon identifier 140, then the weapon 104 may disregard the adjustment command 146. In other implementations, the weapon 104 may implement the adjustment command 146 without regard to any weapon identifier.

The weapon 104 may transmit a confirmation to the weapons manager 110 indicating compliance with the adjustment command 146. The confirmation may include the safety switch status 144. In instances where the weapon 104 did not comply with the adjustment command 146, the weapon 104 may transmit data indicating why the weapon 104 did not comply and/or the safety switch status 144. For example, the weapon 104 may not comply with the adjustment command 146 because the weapon identifier included in the adjustment command 146 does not match the weapon identifier 140. The weapon 104 may transmit, to the weapons manager 110, data indicating that the weapon identifier included in the adjustment command 146 does not match the weapon identifier 140 and/or the safety switch status 144.

The weapons manager 110 may transmit the adjustment command 146 to the weapon 104 and, in some instances, receive a confirmation from the weapon 104. Based on the adjustment command 146 and/or the confirmation from the weapon 104, the weapons manager 110 may request, from the mobility manager 112, data identifying the computing devices that are within a threshold distance of the weapon 104. The threshold distance may be based on the type of weapon that the weapon 104 is. For example, the threshold distance may be one thousand meters for a revolver, two thousand meters for a semiautomatic firearm, and three thousand meters for an automatic firearm. The threshold distance may be based on whether the weapon 104 complied with the adjustment command 146, whether the weapon 104 is enabled or disabled, whether the weapon 104 is a law enforcement weapon, whether the weapon 104 is stolen, and/or any other similar factor.

The mobility manager 112 may identify the camera 150 and computing devices 158 and 166 as the computing devices that are within the threshold distance of the weapon 104. The weapons manager 110 may interface with the notification manager 132 to determine any actions that the camera 150 and computing devices 158 and 166 should perform and/or any notifications that should be provided to the camera 150 and computing devices 158 and 166. The notification manager 132 may access notification settings 134 to determine any actions that the camera 150 and computing devices 158 and 166 should perform and/or any notifications that should be provided to the camera 150 and computing devices 158 and 166.

The users 156 and 164 may update the notification settings for the computing devices 158 and 166. This updating may occur in advance of the weapons manager 110 outputting the adjustment command 146, at any time while the weapon 104 is within a threshold distance of the school 136, and/or at any time while the users 156 or 164 are within threshold distance of the weapon 104. In some implementations, the computing devices 158 and 166 may include applications that interface with the notification manager 132 and that allow the users 156 and 164 to update their notification settings. In some implementations, the operating systems of the computing devices 158 may interface with the notification manager 132 and allow the users 156 and 164 to update their notification settings. In some implementations, the users 156 and 164 may access a web application to update their notification settings.

The notification manager 132 may indicate that the user 156 wishes to be notified when there is a weapon within a threshold distance of the user 156, and that the user 156 wishes to be notified with there is a weapon within a threshold distance of the user 164. Based on those notification settings, the notification manager 132 may generate notification 168 indicating that the weapon 104 is in the vicinity of the school 136 and notification 160 indicating that the weapon 104 is in the vicinity of the computing device 158. In some implementations, the notification manager 132 may output the notification 168 independent of whether the weapon 104 is enabled or disabled.

The notification manager 132 may transmit the notification 168 to the computing device 166. The computing device 166 may receive the notification 168 and generate a graphical interface 170 based on the notification 168. In the example of FIG. 1, the graphical interface 170 may indicate that a weapon is in the vicinity of the school 136. The computing device 166 may present the graphical interface 170 on a display of the computing device 166. In some implementations, the computing device 166 includes an application that generates the graphical interface 170. In some implementations, the operating system of the computing device 166 generates the graphical interface 170.

The notification manager 132 may transmit the notification 160 to the computing device 158. The computing device 158 may receive the notification 160 and generate a graphical interface 162 based on the notification 160. In the example of FIG. 1, the graphical interface 162 may indicate that a weapon is in the vicinity of the computing device 158. The computing device 158 may present the graphical interface 162 on a display of the computing device 158. In some implementations, the computing device 158 includes an application that generates the graphical interface 162. In some implementations, the operating system of the computing device 158 generates the graphical interface 162.

The notification manager 132 may determine that the camera 150 is configured to be enabled in response to a command from the notification manager 132. The camera 150 may be located off the property of the school 136 and may be configured to monitor property 148. Because the camera 150 is within a threshold distance of the school 136, there is a chance that the camera 150 may capture an image and/or video of the weapon 104 and/or the user 102. The notification manager 132 may transmit a camera request 154 to the camera 150 to enable. The camera 150 may receive the camera request 154 and enable the camera 150.

In some implementations, the camera 150 may be configured to transmit a confirmation, to the notification manager 132, indicating that the camera 150 complied with the camera request 154. In instances where the camera 150 is not able to comply with the camera request 154, then the camera may transmit, to the notification manager 132, data indicating that the camera 150 did not comply with the camera request 154. In some implementations, the camera request 154 may include a time period for the camera 150 to remain enabled. In this case, the camera 150 may transmit a confirmation in response to complying with the camera request 154 and data indicating when the camera 150 deactivates after the time period has elapsed. In some implementations, the notification manager 132 may transmit an additional request to the camera to deactivate, activate, or return to normal operation in response to a request from the weapons manager 110. Normal operation may include the camera 150 operating as the camera 150 did before receiving the camera request 154. Normal operation may be a default operation. The weapons manager 110 may determine that the weapon is no longer within a threshold distance of the camera 150 and may instruct the notifications manager 132 to instruct the camera to return to normal operation.

In some implementations, the camera 150 may be configured to be adjusted remotely. In this case, the notification manager 132 may be configured to instruct the camera to pan and/or zoom into an area where the weapon 104 is located. The notification manager 132 may provide additional instructions to the camera 150 in response to the weapon 104 moving. The notification manager 132 may instruct the camera 105 to capture image and/or video data while the notification manager 132 instructs the camera 150 on the appropriate position.

The weapons manager 110 may continue to analyze the current and past locations of the weapon 104 received from the mobility manager, the location data 116, the context data received from the context identifier 124, the predicted path from the path predictor 126, the disabled status 122 of the weapon 104, and/or any special status 120 of the weapon 104 using the weapon disabling rules 128 and/or the weapon disabling models 130. Based on this analysis the weapons manager 110 may transmit an instruction to the weapon 104 to maintain the disable setting of a previous instruction, change the disable setting, or return to a normal, or default, disable setting.

Figure 2:
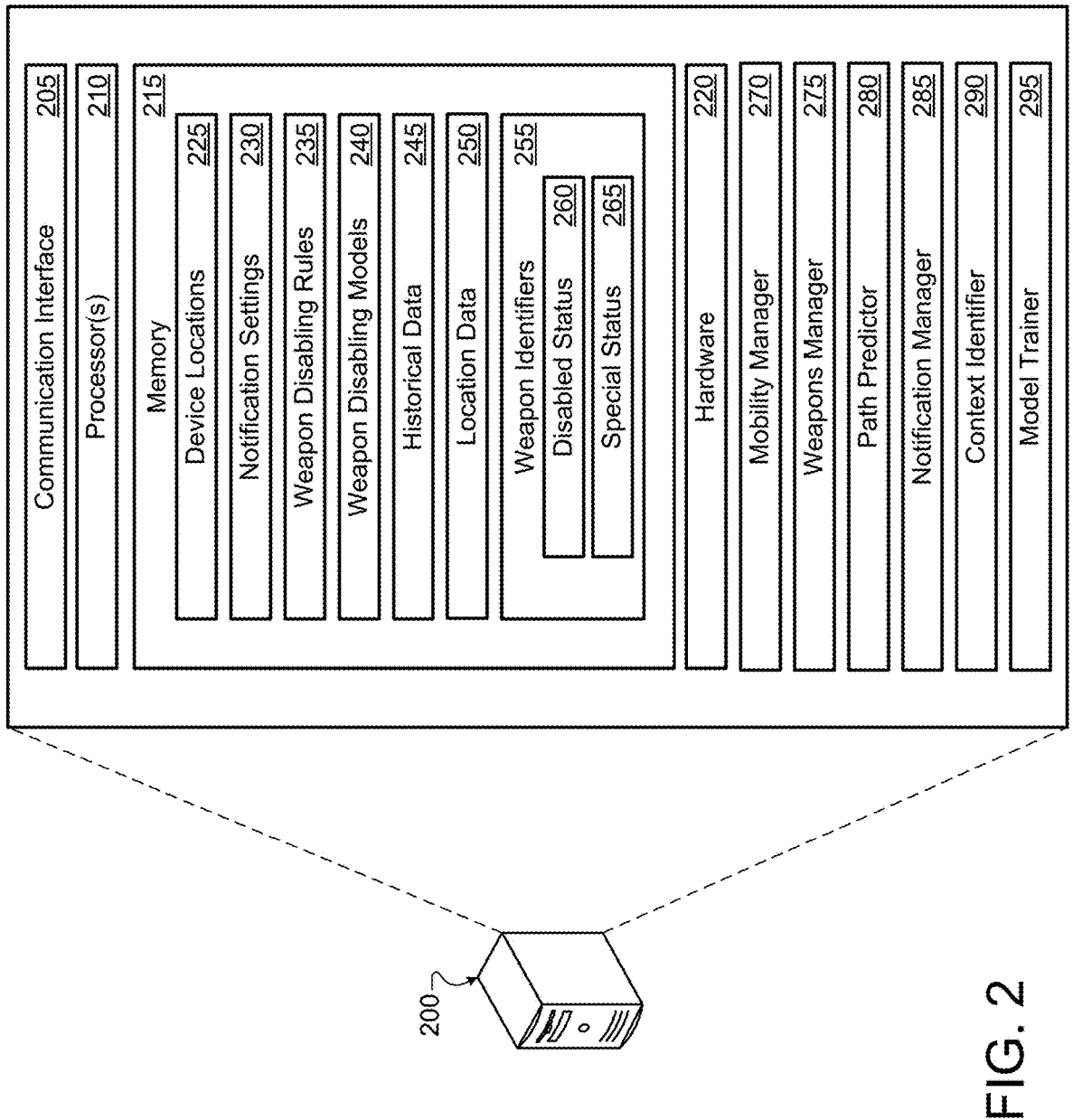
FIG. 2 illustrates an example server that is configured to disable a weapon based on the location of the weapon.

FIG. 2 illustrates an example server 200 that is configured to disable a weapon based on the location of the weapon. The server 200 may be any type of computing device that is configured to communicate with other computing devices. The server 200 may be integrated into a wireless carrier network, interact with a wireless carrier network, be integrated into a wireless IP network, and/or interact with a wireless IP network. The server 200 may communicate with other computing devices using a wide area network, a local area network, the internet, a wired connection, a wireless connection, and/or any other type of network or connection. The wireless connections may include Wi-Fi, short-range radio, infrared, and/or any other similar wireless connection. The server 200 may be similar to the server 106 of FIG. 1. Some of the components of the server 200 may be implemented in a single computing device or distributed over multiple computing devices. Some of the components may be in the form of virtual machines or software containers that are hosted in a cloud in communication with disaggregated storage devices.

The server 200 may include a communication interface 205, one or more processors 210, memory 215, and hardware 220. The communication interface 205 may include communication components that enable the server 200 to transmit data and receive data from devices connected to the wireless carrier network. The communication interface 205 may include an interface that is configured to communicate with base stations of a wireless carrier network. The communication interface 205 may receive data that other devices transmit to the base stations and/or transmit data to the base stations for transmission to the other devices. In some implementations, the communication interface 205 may be configured to communicate using over a wide area network, a local area network, the internet, a wired connection, a wireless connection, and/or any other type of network or connection. The wireless connections may include Wi-Fi, short-range radio, infrared, and/or any other similar wireless connection.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multi-media/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a mobility manager 270. The mobility manager 270 may be similar to the mobility manager 112 of FIG. 1. The mobility manager 270 may be configured to monitor the location of a computing device that is connected to the server 200 through a wireless base station such as a gNodeB or that is communicating with the server 200 through a different communication channel. The location of the computing device may include the wireless base station to which the computing device is connected and/or GPS data received from the subscriber device. The mobility manager 270 may store the location data in the device locations 225 that is implemented by the memory 215.

In some implementations, the mobility manager 270 may determine the location of a computing device at periodic intervals, such as every five seconds. In some implementations, the mobility manager 270 may determine the location of a computing device when the computing device connects to a different wireless base station and/or provides updated GPS data. In some implementations, the mobility manager 270 may determine the location of the computing device relative to the base station with which the computing device is communicating. In this case, the mobility manager 270 may determine the relative location based on data collected from the base station such as signal strength and direction of communications between the computing device and the base station. The mobility manager 270 may also determine the relative location based on the location of the base station and GPS data received from the computing device. The relative location data may include a distance between the computing device and the base station, the cardinal direction from the base station to the subscriber device, and/or any other similar measurements.

The one or more processors 210 may implement a weapons manager 275. The weapons manager 275 may be similar to the weapons manager 110 of FIG. 1. The weapons manager 275 may be configured to monitor a weapon and determine whether to disable the weapon. The weapon may be similar to weapon 104 and may be configured to communicate with the server 200. The weapons manager 275 may determine other actions to take based on the status of the weapon. The other actions may include generating and transmitting instructions to enable the weapon, generating and transmitting notifications to other computing devices, generating and transmitting instructions to other computing devices, and/or any other similar actions. The weapons manager 275 may be configured to monitor and manage multiple weapons. The weapons manager 275 may be configured to manage different types of weapons that include a communications interface integrated into the weapon and/or added as an accessory.

The weapons manager 275 may access location data 250 that identifies locations of buildings and/or entities that occupy buildings at various locations. The location data 250 may include data that relates a building to a GPS coordinate and/or another location identifier. The location data 250 may also include data that relates an entity to a GPS coordinate and/or another location identifier. For example, the location data 250 may relate a location to a GPS coordinate and indicate that a school is located at that GPS coordinate. In some implementations, the location data 250 may include classification data for the type of building and/or entity at each location. Some of the classifications for buildings may include residential building, commercial building, industrial building, government building, and/or any other similar classification. Some additional classifications may include school, restaurant, theater, office, warehouse, apartment, grocery store, stadium, bar, bank, and/or any other similar classification. The location data 250 may include data identifying the entity at the location. The data identifying the entity may include a name of a business or businesses that occupy each location.

The one or more processors 210 may implement a context identifier 290. The context identifier 290 may be similar to the context identifier 124 of FIG. 1. The context identifier 290 may be configured to determine the context related to a weapon. The context may include data related to the identity of a registered owner of a weapon, any criminal history of the registered owner, the time, the date, the type of weapon, the history of the weapon, the purchase date of the weapon, and/or any other similar details. The history of the weapon may include previous movements of the weapon, the number of times and locations of where the weapon was discharged, the identity of previous owners of the weapon. The context may also include data related to the weather and current events.

The one or more processors 210 may implement a path predictor 280. The path predictor 280 may be similar to the path predictor 126 of FIG. 1. The path predictor 280 may be configured to receive location data of a weapon and predict the future movement of the weapon. The path predictor 280 may receive location data determined by the mobility manager 270. The location data may identify the previous locations of the weapon for the past few hours, days, weeks, or any other similar time period. The location data may identify the previous ten, twenty, or any other similar number of locations of the weapon. Based on the current and past locations of the weapon, the path predictor 280 may determine a likely path of the weapon. The path predictor 280 may access mapping data and use rules and/or machine learning models to determine the likely path of the weapon.

In some implementations, the path predictor 280 may receive past movement data and a current location of the owner of the weapon based on the past locations and current locations of a computing device of the owner of the weapon that communicates with the server 200. The path predictor 280 may use the past movement data and the current location of the owner of the weapon to determine the likely path of the weapon. In some implementations, the path predictor 280 may receive past movement data and a current location of a computing device that is configured to communicate with the server 200 and whose movement is correlated with the movement of the weapon.

The memory may store weapons identifiers 255. The weapons identifiers 255 may store data related to the weapons that the weapons manager 270 is able to monitor and remotely enable and disable. The stored data may include unique identifiers for each of the weapons. Each weapon may store a matching unique identifier. The weapons manager 275 may assign the weapon identifier at the time of purchase and/or during provisioning. The weapon may store the weapon identifier locally on the weapon. The weapons manager 275 may store a matching weapon identifier in the weapons identifiers 255.

The weapons identifiers 255 may include a disabled status 260 for each weapon identifier. If the weapons manager 275 transmits an instruction to disable a weapon, then the weapons manager 275 may indicate that the disabled status 260 of the weapon is "disabled." If the weapons manager 275 transmits an instruction to enable a weapon, then the weapons manager 275 may indicate that the disabled status 260 of the weapon is "enabled." In some implementations, the weapons manager 275 may update the disabled status 260 after receiving confirmation from the weapon. For example, the weapons manager 275 transmits an instruction to disable the weapon. The weapon receives the instruction, disables the weapon, and transmits a confirmation indicating that the weapon is disabled. The weapons manager 275 receives the confirmation and updates the disabled status 260.

The weapon identifiers 255 may include a special status 265 for each weapon identifier. The special status 265 may indicate the owner of the weapon, the type of owner of the weapon, whether the weapon has been reported stolen, whether the weapon was previously involved in a crime, and/or any other similar information. For example, the special status 265 may indicate that a weapon is a law enforcement weapon.

The weapons manager 275 may use the weapon disabling rules 235 and/or the weapon disabling models 240 to determine whether to adjust the disable status of the weapon. The weapons manager 275 may apply the current and past locations of the weapon received from the mobility manager 270, the location data 250, the context data received from the context identifier 290, the predicted path from the path predictor 280, the disabled status 260 of the weapon, and/or any special status 265 of the weapon to the weapon disabling rules 235 and/or the weapon disabling models 240. Based on the output of the weapon disabling rules 235 and/or the weapon disabling models 240, the weapons manager 275 may adjust the disabled status of the weapon.

The weapons disabling rules 235 may include one or more rules that specify how to compare the current and past locations of the weapon received from the mobility manager 270, the location data 250, the context data received from the context identifier 290, the predicted path from the path predictor 280, the disabled status 260 of the weapon, and/or any special status 265 of the weapon to determine whether to enable or disable the weapon. An example rule may specify to disable the weapon if the weapon is moving in the direction of a school, the weapon is not a law enforcement weapon, and the weapon is within one thousand meters of the school. Another example rule may specify to disable the weapon if the weapon is within one thousand meters of a school and the weapon is identified as stolen. Another example rule may specify to disable the weapon if the weapon is within five hundred meters of a government facility, the weapon is moving in the direction of the government facility, and the weapon is not a law enforcement weapon. Another example rule may specify to not disable the weapon if the weapon is a law enforcement weapon and the weapon is not stolen.

The weapon disabling models 240 may be configured to receive the current and past locations of the weapon received from the mobility manager 270, the location data 250, the context data received from the context identifier 290, the predicted path from the path predictor 280, the disabled status 260 of the weapon, and/or any special status 265 of the weapon and output whether the status of the weapon should be enabled or disabled. The weapon disabling models 240 may be trained using machine learning and historical data. The historical data 245 may include previous locations of weapons, previous location data, previous context data, previous predicted paths of weapons, previous disabled statuses of weapons, and/or previous special statuses of weapons.

The weapon disabling models 240 may include various models that are each configured to receive different data. For example, a model may be configured to receive current and past locations of the weapon, the location data 250, and the special status 265 of the weapon. Another model may be configured to receive the current and past locations of the weapon received from the mobility manager 270 and the predicted path from the path predictor 280. Another model may be configured to receive the context data received from the context identifier 290 and the special status 265 of the weapon. The weapon manager 275 may select the model that is configured to receive the data that the weapon manager 275 has received. For example, if the weapons manager 275 did not receive context data from the context identifier 290, then the weapons manager 275 may not select a model that is configured to receive context data.

The one or more processors 210 may implement a model trainer 295. The model trainer 295 may be configured to train the weapon disabling models 240 using machine learning and the historical data 245. The historical data 245 may include data collected from various weapons. The historical data 245 may include past locations of the weapons, location data for those locations, past context data, the special status of the weapon, and/or past predicted paths. The historical data 245 may also include whether the weapon was discharged. The model trainer 295 may organize the historical data 245 by generating data samples and train the weapon disabling models 240 using those data samples.

The model trainer 295 may generate the data samples by taking a snapshot of the historical data 245 for each weapon at various times. For a first weapon, the model trainer 295 may generate multiple data samples using the location of the first weapon, the past locations of the first weapon, the location data related to the location and/or the past locations, the context data of the first weapon, the special status of the first weapon, the predicted path of the first weapon, and whether the first weapon was discharged, at various points in time. The discharging time period may include the time period from one data sample to the next data sample. For a second weapon, the model trainer 295 may generate multiple data samples using the location of the second weapon, the past locations of the second weapon, the location data related to the location and/or the past locations, the context data of the second weapon, the special status of the second weapon, the predicted path of the second weapon, and whether the second weapon was discharged, at various points in time. The model trainer 295 may repeat this process for other weapons. Using the data samples, the model trainer 295 may train, using machine learning, a model that is configured to receive the current location of the weapon, the past locations of the weapon, the location data related to the current location and/or the past locations, the context data of the weapon, the special status of the weapon, and the predicted path of the first weapon. The model may be configured to output whether the disable status of the weapon should be enabled or disabled.

The model trainer 295 may generate additional data samples by taking a snapshot of the historical data 245 for the same or additional weapons at various times. In this case, the historical data 245 may include the current location of the weapons, the previous locations of the weapons, the predicted paths of the weapons, and whether the weapon was discharged. For a first weapon, the model trainer 295 may generate multiple data samples using the location of the first weapon, the past locations of the first weapon, the predicted path of the first weapon, and whether the weapon was discharged, at various points in time. For a second weapon, the model trainer 295 may generate multiple data samples using the location of the second weapon, the past locations of the second weapon, the predicted path of the second weapon, and whether the weapon was discharged, at various points in time. Using these data samples, the model trainer 295 may train, using machine learning, a model that is configured to receive the current location of the weapon, the previous locations of the weapon, and the predicted path of the weapon. The model may be configured to output whether the weapon should be enabled or disabled.

The model trainer 295 may update the weapon disabling models 240 as the server 200 receives additional historical data 245. The server 200 may receive additional historical data 245 from additional weapons or from the same weapons that provided the historical data 245. The additional weapons may be newly purchased weapons and/or weapons that now include an accessory communicates with the server 200. The model trainer 295 may generate additional data samples using the additional historical data 245. The model trainer 295 may retrain the models using machine learning and the additional data samples combined with the previous data samples.

The weapons manager 275 may receive the adjustment to the disabling status or the disabling status output by the weapon disabling models 240 and/or the weapon disabling rules 235. The weapons manager 275 may generate an adjustment command based on the disabling status output by the weapon disabling models 240 and/or the weapon disabling rules 235. The weapons manager 275 may determine whether to generate the adjustment command by comparing the disabling status output by the weapon disabling models 240 and/or the weapon disabling rules 235 to the disabled status 260 of the weapon. If the disabling status output by the weapon disabling models 240 and/or the weapon disabling rules 235 is the same as the disabled status 260 of the weapon, then the weapons manager 275 may not generate an adjustment command. In some implementations, the weapons manager 275 may generate an adjustment command independent of the disabled status 260 of the weapon. The weapons manager 275 may output the adjustment command to the weapon using the communication interface 205. In some implementations, the weapons manager 275 may identify other weapons owned by a same person. In some instances, the weapons manager 275 may transmit a similar enable/disable command to those weapons owned by the same person.

The one or more processors 210 may implement a notification manager 285. The notification manager 285 may be similar to the notification manager 132 of FIG. 1. The notification manager 285 may be configured to determine whether to transmit notifications to computing devices in the vicinity of the weapon. The notification manager 285 may access the notification settings 230 that indicate under what circumstances a computing device in the vicinity of the weapon should be notified of the presence of the weapon.

The notification manager 285 may access the mobility manager 270 to determine the computing devices in the vicinity of the weapon. The notification manager 285 may determine how to define the vicinity of the weapon (e.g., a threshold distance from the weapon) based on the type of weapon, whether the weapon is enabled or disabled, and/or any other information related to the weapon. In some implementations, the notification manager 285 may define the vicinity of the weapon based on the notification settings 230. The maximum distance that a user has requested in the notification settings 230 may define the vicinity of the weapon. For example, a user has requested a notification if a weapon is within two thousand meters of a user, then the notification manager 285 may request that the mobility manager 270 identify the computing devices within two thousand meters of the weapon.

The notification manager 285 identifies the computing devices in the vicinity of the weapon and determine the notification settings 230 for each computing device. Users of some computing devices may request to be notified if the weapon is within one thousand meters of the user. If the weapon is two thousand meters from the computing device, then the notification manager 285 may not transmit a notification to the users who requested to be notified if the weapon is within one thousand meters of the user. The notification manager 285 may transmit a notification to the users who requested to be notified if the weapon is within two thousand meters of the user.

In some instances, the distance that each user provides to the notification settings 230 may depend on various characteristics of the weapon such as the type of weapon, whether the weapon is stolen, whether the weapon is a law enforcement weapon, whether the weapon has previously been used in a crime, whether the weapon is enabled, and/or any other similar characteristics. For example, a user may request to be notified if an enabled weapon is within one thousand meters and if a disabled weapon is within two hundred meters.

The notification manager 285 may also access the notification settings 285 to identify the users who requested notification based on the location of the weapon relative to a specific location. For example, a user may request that if the weapon is within two hundred meters of a particular school, then the notification manager 285 should transmit a notification to that user. The notification manager 285 may identify the users who requested notification based on the location of the weapon, generate a notification, and transmit the notification to the computing devices of those users.

The notification manager 285 may also identify the computing devices that are configured to capture audio and/or video in the vicinity of the weapon. These computing devices may also be configured to receive commands from the server 200 to capture audio and/or video. The vicinity of the weapon may include a threshold distance from the predicted path of the weapon and a threshold distance from the current location of the weapon. For example, the vicinity of the weapon may include one hundred meters from the current location of the weapon and fifty meters from the predicted path. In some implementations, the threshold distance may be based on various characteristics of the weapon such as the type of weapon, whether the weapon is stolen, whether the weapon is a law enforcement weapon, whether the weapon has previously been used in a crime, whether the weapon is enabled, and/or any other similar characteristics. The notification manager 285 may transmit a notification to the computing devices to begin capturing audio and/or video. The notification manager 285 may request that the computing devices transmit the audio and/or video to the server 200.

Figure 3:
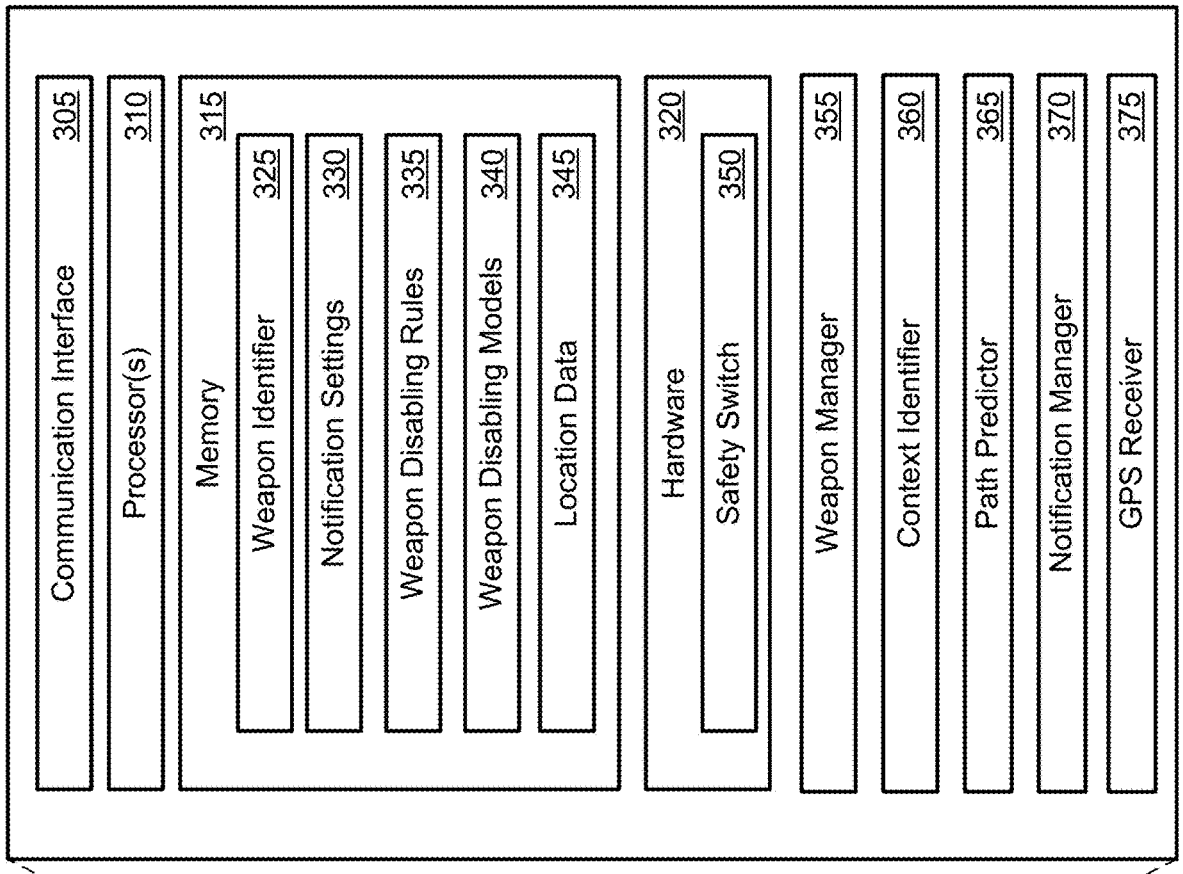
FIG. 3 illustrates an example weapon that is configured to disable based on the location of the weapon.

FIG. 3 illustrates an example weapon 300 that is configured to be disabled based on the location of the weapon 300. The weapon 300 may be any type of weapon that is configured to communicate with other computing devices. The weapon 300 may be able to interact with a wireless carrier network. The weapon 300 may communicate with other computing devices using a wide area network, a local area network, the internet, a wired connection, a wireless connection, and/or any other type of network or connection. The wireless connections may include Wi-Fi, short-range radio, infrared, and/or any other similar wireless connection. The weapon 300 may be similar to the weapon 104 of FIG. 1. Some of the components of the weapon 300 may be implemented in a single computing device or distributed over multiple computing devices, such as one or more aftermarket accessories. Some of the components may be in the form of virtual machines or software containers that are hosted in a cloud in communication with disaggregated storage devices.

The weapon 300 may include a communication interface 305, one or more processors 310, memory 315, and hardware 320. The communication interface 305 may include communication components that enable the weapon 300 to transmit data and receive data from devices connected to the wireless carrier network. The communication interface 305 may include an interface that is configured to communicate with base stations of a wireless carrier network. The communication interface 305 may receive data that other devices transmit to the base stations and/or transmit data to the base stations for transmission to the other devices. In some implementations, the communication interface 305 may be configured to communicate using over a wide area network, a local area network, the internet, a wired connection, a wireless connection, and/or any other type of network or connection. The wireless connections may include Wi-Fi, short-range radio, infrared, and/or any other similar wireless connection.

The hardware 320 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, fingerprint readers, and any other suitable devices. The hardware 320 may also include a safety switch 350. The safety switch 350 may be configured to prevent the weapon 300 from discharging. The safety switch 350 may be configured to be controlled by other components of the weapon 300, such as the weapon manager 355.

The memory 315 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 310 may implement a weapon manager 355. The weapon manager 355 may be similar to the weapons manager 110 of FIG. 1 and/or the weapons manager 275 of FIG. 2. The weapons manager 355 may be configured to monitor the weapon 300 and determine whether to enable or disable the weapon 300 by adjusting the safety switch 350. The weapons manager 355 may determine other actions to take based on the status of the weapon 300. The other actions may include generating and transmitting notifications to other computing devices, generating and transmitting instructions to other computing devices, and/or any other similar actions.

The weapons manager 355 may access location data 345 that identifies locations of buildings and/or entities that occupy buildings at various locations. The location data 345 may include data that relates a building to a GPS coordinate and/or another location identifier. The location data 345 may also include data that relates an entity to a GPS coordinate and/or another location identifier. For example, the location data 345 may relate a location to a GPS coordinate and indicate that a school is located at that GPS coordinate. In some implementations, the location data 345 may include classification data for the type of building and/or entity at each location. Some of the classifications for buildings may include residential building, commercial building, industrial building, government building, and/or any other similar classification. Some additional classifications may include school, restaurant, theater, office, warehouse, apartment, grocery store, stadium, bar, bank, and/or any other similar classification. The location data 345 may include data identifying the entity at the location. The data identifying the entity may include a name of a business or businesses that occupy each location.

The one or more processors 310 may implement a context identifier 360. The context identifier 360 may be similar to the context identifier 124 of FIG. 1 and/or the context identifier 290 of FIG. 1. The context identifier 360 may be configured to determine the context related to the weapon 300. The context may include data related to the identity of a registered owner of the weapon 300, any criminal history of the registered owner, the time, the date, the type of weapon 300, the history of the weapon 300, the purchase date of the weapon 300, and/or any other similar details. The history of the weapon 300 may include previous movements of the weapon 300, the number of times and locations of where the weapon 300 was discharged, and the identity of previous owners of the weapon 300. The context may also include data related to the weather and current events.

The one or more processors 310 may implement a path predictor 365. The path predictor 365 may be similar to the path predictor 126 of FIG. 1 and/or the path predictor 280 of FIG. 1. The path predictor 365 may be configured to receive location data of the weapon and predict the future movement of the weapon 300. The path predictor 365 may receive location data determined by the GPS receiver 375. The path predictor 365 may use the previous locations of the weapon 300 for the past few hours, days, weeks, or any other similar time period to predict the path of the weapon 300. The previous locations may identify the previous ten, twenty, or any other similar number of locations of the weapon 300. Based on the current and past locations of the weapon 300, the path predictor 365 may determine a likely path of the weapon 300. The path predictor 365 may access mapping data and use rules and/or machine learning models to determine the likely path of the weapon 300.

In some implementations, the path predictor 365 may receive past movement data and a current location of the owner of the weapon based on the past locations and current locations of a computing device whose movements are similar to the movements of the weapon 300. The path predictor 365 may use the past movement data and the current location of the owner of the weapon to determine the likely path of the weapon 300.

The memory may store the weapon identifier 325. The weapon identifier 325 may store data such as a unique identifier for the weapon 300. Different weapons may store different unique identifiers. A server may assign the weapon identifier 325 at the time of purchase and/or during provisioning. The weapon identifier 325 may include a special status. The special status may indicate the owner of the weapon 300, the type of owner of the weapon 300, whether the weapon 300 has been reported stolen, whether the weapon 300 was previously involved in a crime, and/or any other similar information. For example, the special status may indicate that a weapon 300 is a law enforcement weapon.

The weapons manager 355 may use the weapon disabling rules 335 and/or the weapon disabling models 340 to determine whether to adjust the disable status of the weapon 300. The weapons manager 355 may apply the current and past locations of the weapon 300, the location data 345, the context data received from the context identifier 360, the predicted path from the path predictor 365, the status of the safety switch 350, and/or any special status of the weapon 300 to the weapon disabling rules 336 and/or the weapon disabling models 340. Based on the output of the weapon disabling rules 335 and/or the weapon disabling models 340, the weapons manager 355 may adjust the safety switch 350.

The weapons disabling rules 335 may include one or more rules that specify how to compare the current and past locations of the weapon 300, the location data 345, the context data received from the context identifier 360, the predicted path from the path predictor 365, the status of the safety switch 350, and/or any special status of the weapon 300 to determine whether to adjust the safety switch 350. The weapon 300 may receive the weapons disabling rules 335 from a server. An example rule may specify to engage the safety switch 350 if the weapon 300 is moving in the direction of a school, the weapon 300 is not a law enforcement weapon, and the weapon 300 is within one thousand meters of the school. Another example rule may specify to engage the safety switch 350 if the weapon 300 is within one thousand meters of a school and the weapon 300 is identified as stolen. Another example rule may specify to engage the safety switch 350 if the weapon 300 is within five hundred meters of a government facility, the weapon 300 is moving in the direction of the government facility, and the weapon 300 is not a law enforcement weapon. Another example rule may specify to not engage the safety switch 350 if the weapon 300 is a law enforcement weapon and the weapon 300 is not stolen.

The weapon disabling models 340 may be configured to receive the current and past locations of the weapon 300, the location data 345, the context data received from the context identifier 360, the predicted path from the path predictor 365, the status of the safety switch 350, and/or any special status of the weapon 300 and output whether the safety switch 350 should be enabled or disabled. The weapon 300 may receive the weapon disabling models 340 from a server. The weapon disabling models 340 may be trained using machine learning and historical data. The historical data may include previous locations of weapons, previous location data, previous context data, previous predicted paths of weapons, previous disabled statuses of weapons, and/or previous special statuses of weapons.

The weapon disabling models 340 may include various models that are each configured to receive different data. For example, a model may be configured to receive current and past locations of the weapon 300, the location data 345, and the special status of the weapon 300. Another model may be configured to receive the current and past locations of the weapon 300 and the predicted path from the path predictor 365. Another model may be configured to receive the context data received from the context identifier 360 and the special status of the weapon 300. The weapon manager 355 may select the model that is configured to receive the data that the weapon manager 355 has received. For example, if the weapons manager 355 did not receive context data from the context identifier 360, then the weapons manager 355 may not select a model that is configured to receive context data.

The one or more processors 310 may implement a notification manager 370. The notification manager 370 may be similar to the notification manager 132 of FIG. 1 and/or the notification manager 285 of FIG. 2. The notification manager 370 may be configured to determine whether to transmit notifications to computing devices in the vicinity of the weapon 300. The notification manager 370 may access the notification settings 330 that indicate under what circumstances a computing device in the vicinity of the weapon 300 should be notified of the presence of the weapon 300.

The notification manager 370 may access the communication interface 305 to detect computing devices in the vicinity of the weapon 300. The communication interface 305 may detect computing devices using short-range radio, Wi-Fi communications, cellular radio, infrared communications, and/or any other similar communications technique. In some implementations, the notification manager 370 may receive data identifying the computing devices in the vicinity of the weapon 300 from a server.

The notification manager 370 identifies the computing devices in the vicinity of the weapon 300 and determines the notification settings 330 for each computing device. Users of some computing devices may request to be notified if the weapon 300 is within one thousand meters of the user. If the weapon 300 is two thousand meters from the computing device, then the notification manager 370 may not transmit a notification to the users who requested to be notified if the weapon 300 is within one thousand meters of the user. The notification manager 370 may transmit a notification to the users who requested to be notified if the weapon 300 is within two thousand meters of the user.

The notification manager 370 may also access the notification settings 330 to identify the users who requested notification based on the location of the weapon 300 relative to a specific location. For example, a user may request that if the weapon 300 is within two hundred meters of a particular school, then the notification manager 370 should transmit a notification to that user. The notification manager 370 may identify the users who requested notification based on the location of the weapon 300, generate a notification, and transmit the notification to the computing devices of those users.

The notification manager 370 may also identify the computing devices that are configured to capture audio and/or video in the vicinity of the weapon. These computing devices may also be configured to receive commands from the weapon 300 to capture audio and/or video. The notification manager 370 may transmit a notification to the computing devices to begin capturing audio and/or video. The notification manager 370 may request that the computing devices transmit the audio and/or video to the weapon 300 and/or a server. The notification manager 370 may determine to transmit a request to begin capturing audio and/or video based on various characteristics of the weapon 300 such as the type of weapon, whether the weapon 300 is stolen, whether the weapon 300 is a law enforcement weapon, whether the weapon 300 has previously been used in a crime, whether the weapon 300 is enabled, and/or any other similar characteristics.

FIG. 4 is a flowchart of an example process 400 for disabling a weapon based on the location of the weapon. In general, the process 400 determines a location and projected travel path of a weapon. The process 400 generates and outputs an instruction to disable the weapon based on the location and projected travel path of the weapon. The process 400 will be described as being performed by the server 106 of FIG. 1 and will include references to other components in FIG. 1. The process 400 may also be performed by the server 200 of FIG. 2.

The server 106 determines that a weapon 104 is in a particular location (410). The weapon 104 may include a communications interface 138 that allows the weapon 104 to communicate with the server 106. The server 106 may determine the location of the weapon based on GPS data received from the weapon 104, based on triangulation with base stations that are able to communicate with the weapon 104, and/or any other similar technique.

The server 106 determines a projected travel path of the weapon 104 (420). The server 106 determines the projected travel path of the weapon 104 based on past movements of the weapon 104, mapping data, the date and time, and any other similar information. For example, if the weapon 104 has been moving at thirty-five miles per hour along a road with a speed limit of thirty miles per hour, then the projected travel path may indicate that the weapon 104 is likely to continue along that road at a similar speed. If the weapon 104 typically moves to a specific location on Saturday mornings, then the projected travel path may indicate that the weapon 104 is likely to continue to that specific location if the weapon 104 is moving on Saturday morning.

Based on determining that the weapon 104 is in a particular location and the projected travel path of the weapon 104, the server 106 generates an instruction to disable the weapon 104 (430). In some implementations, the server 106 may apply the particular location and the projected travel path to weapon disabling rules 128 and/or weapon disabling models 130. Based on the outputs from the weapon disabling rules 128 and/or weapon disabling models 130, the server 106 may generate an instruction to adjust a disable status of the weapon 104. In some implementations, the server 106 may generate the instruction to adjust a disable status of the weapon 104 based on the weapon 104 including a communication interface 138 that is able to communicate with the server 106.

In some implementations, the server 106 generates the instruction to adjust a disable status of the weapon 104 based on comparing the previous movements of the weapon 104 to the projected travel path of the weapon 104. For example, if the previous movements indicate that the weapon 104 typically moves between the same locations along the same paths and the projected travel path indicates that the weapon 104 is likely to move along a different path, then the server 106 may determine that the projected path of the weapon 104 is not typical for the weapon 104. Based on the projected path of the weapon 104 not being typical for the weapon 104, the server 106 may generate the instruction to adjust a disable status of the weapon 104.

In some implementations, the server 106 may determine that an additional weapon is in the particular location and/or has a similar projected travel path. The server 106 may determine to bypass generating an instruction to adjust a disable status of the additional weapon. The server 106 may make this determination based on one or more additional factors. The additional weapon may be a law enforcement weapon. The additional weapon may be authorized to be at the particular location maybe because the additional weapon belongs to a security guard of the particular location or a location along the projected travel path. The particular location and the projected travel path may be typical for the additional weapon. The additional weapon may be a lower risk than the weapon 104. For example, the additional weapon is a revolver and the weapon 104 is an automatic weapon.

In some implementations, the particular location may be a location where unauthorized weapons should be disabled. For example, the particular location may be a school, a location where a weapon has been used during a previous time period, a location where a large number (e.g., greater than one thousand) of people are gathering (e.g., a sports event, a concert, etc.), and/or any other slimier location. The server 106 may generate the instruction to adjust a disable status of the weapon 104 based on the particular location being one of those locations.

The server 106 provides, for output to the weapon 104, the instruction to disable the weapon 104 (440). The server 106 may provide the instruction to disable the weapon 104 or the instruction to adjust the disable status of the weapon 104 to the communication interface 138 of the weapon 104. In some implementations, the weapon 104 may provide a confirmation to the server 106 that indicates compliance with the instruction.

In some implementations, the server 106 may determine that the weapon 104 is no longer at the particular location and/or did not travel along the projected travel path. In this case, the server 106 may generate an instruction to enable the weapon 104 or return the disable status to the previous setting. For example, if the server 106 determines that the weapon 104 is headed for the school 136, then the server 106 may generate and output an instruction to disable the weapon 104. If the weapon 104 is no longer moving towards the school 136, then the server 106 may generate and output an instruction to enable the weapon 104.

In some implementations, the server 106 may include a notification manager 132 that is configured to generate and output notifications regarding the location and/or status of weapons. In some instances, a user may request to receive a notification if a weapon is in the vicinity of the particular location. In this case, the server 106 may generate and output a notification to that user indicating that the weapon 104 is at the particular location. In some instances, a user may request to receive a notification if a weapon is in the vicinity of the user. In this case, the server 106 may determine that the user 156 is in the vicinity of the weapon 104. The server 106 may generate and output a notification to the computing device 158 of the user 156 indicating that the weapon 104 is in the vicinity of the user 156.

In some implementations, the server 106 may determine that there is a computing device in the vicinity of the weapon 104 that is configured to capture audio, video, and/or image data. The computing device may be the camera 150. The camera 150 may be located at the property 148. The server 106 may generate and output an instruction to the camera 150 to capture audio, video, and/or image data. The camera 150 may capture audio, video, and/or image data for a particular period of time or until the server 106 indicates to cease capturing audio, video, and/or image data.

Figure 5:
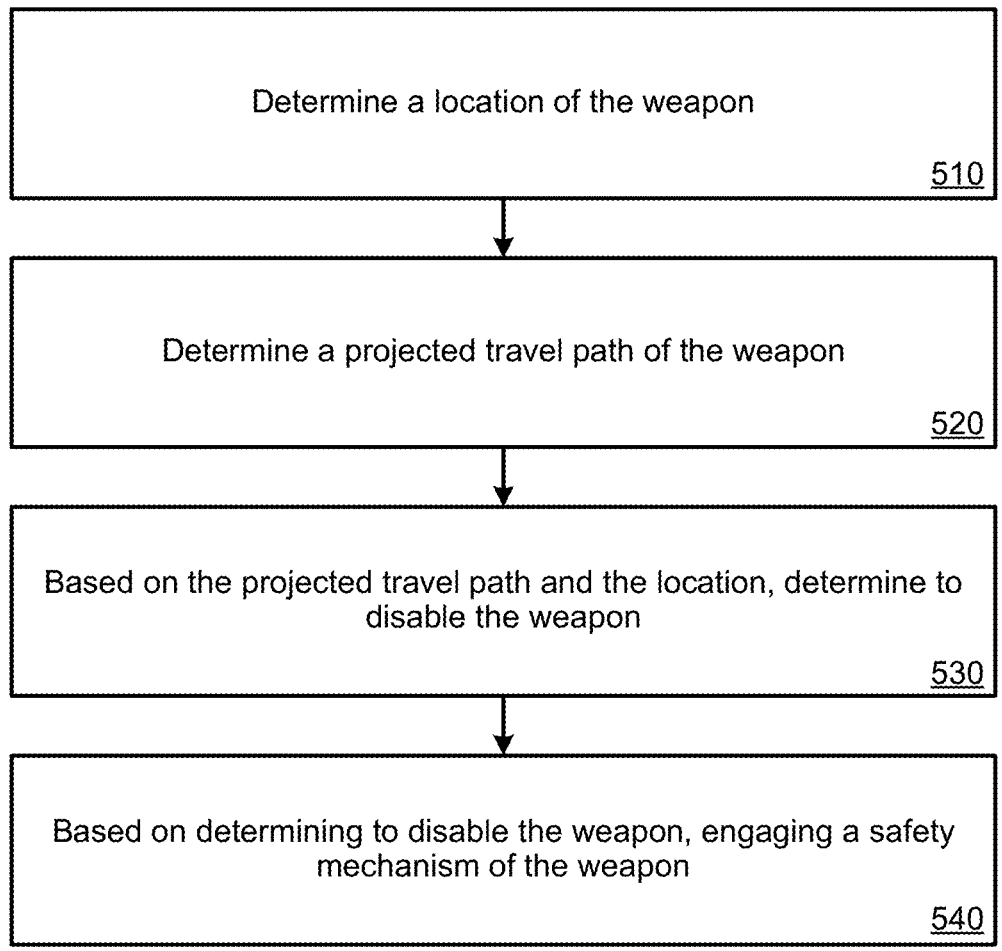
FIG. 5 is a flowchart of an example process for disabling a weapon based on the location and projected travel path of the weapon.

FIG. 5 is a flowchart of an example process 500 for disabling a weapon based on the location and projected travel path of the weapon. In general, the process 500 determines a location and projected travel path of a weapon. The process 500 engages a safety mechanism of the weapon based on the location and projected travel path of the weapon. The process 500 will be described as being performed by the weapon 104 of FIG. 1 and will include references to other components in FIG. 1. The process 500 may also be performed by the weapon 300 of FIG. 3.

The weapon 104 determines a location of the weapon 104 (510). The weapon 104 may include a GPS receiver that is configured to determine the location of the weapon 104. In some instances, the weapon 104 may use triangulation with nearby base stations to determine the location of the weapon 104. In some implementations, the weapon 104 may receive the location of the weapon 104 from a server. The weapon 104 may store data indicating the location of the weapon 104 at various points in time, such as every minute or when the weapon 104 moves more than a threshold distance.

The weapon 104 determines a projected travel path of the weapon 104 (520). The weapon 104 may determine the projected travel path based on the current location and the past locations of the weapon 104. The past locations may include locations of the weapon 104 at similar days and times. For example, if the current day is a Tuesday, then the weapon 104 may analyze the locations at the same time on previous Tuesdays. Based on the travel of the weapon 104 on those days, the weapon 104 may determine a projected travel path. In some implementations, the weapon 104 may analyze mapping data to determine the projected travel path. For example, if the weapon 104 is traveling along a road, then the weapon 104 may determine that projected travel path continues along that road.

Based on the projected travel path and the location, the weapon 104 determines to disable the weapon 104 (530). In some implementations, the weapon 104 may apply the location and the projected travel path to weapon disabling rules and/or weapon disabling models. The weapon may receive the weapon disabling rules and/or the weapon disabling models from a server. Based on the outputs from the weapon disabling rules and/or weapon disabling models, the weapon 104 may determine to adjust a disable status of the weapon 104.

In some implementations, the weapons 104 determines to adjust a disable status of the weapon 104 based on comparing the previous movements of the weapon 104 to the projected travel path of the weapon 104. For example, if the previous movements indicate that the weapon 104 typically moves between the same locations along the same paths, and the projected travel path indicates that the weapon 104 is likely to move along a different path, then the weapon 104 may determine that the projected path of the weapon 104 is not typical for the weapon 104. Based on the projected path of the weapon 104 not being typical for the weapon 104, the weapon 104 may determine to adjust a disable status of the weapon 104.

In some implementations, the location of the weapon 104 may be a location where unauthorized weapons should be disabled. For example, the location may be a school, a location where a weapon has been used during a previous time period, a location where a large number (e.g., greater than one thousand) of people are gathering (e.g., a sports event, a concert, etc.), and/or any other slimier location. The weapon 104 may determine to adjust a disable status of the weapon 104 based on the weapon 104 being at one of those locations.

Based on determining to disable the weapon 104, the weapon 104 engages a safety mechanism of the weapon 104 (540). The weapon 104 may include a safety switch 142 that is configured to be controlled electronically by the weapon 104. For example, the weapon 104 may include a processor that instructs the safety switch 142 to engage, which disables the gun. The weapon 104 may continuously monitor the location of the weapon 104, the projected travel path of the weapon, the entities that are at locations in the vicinity of the weapon 104, and/or any special status of the weapon 104. Based on those factors, the weapon 104 may adjust the safety switch 142. In some implementations, the weapon 104 may transmit data to a server 106 indicating the status of the safety switch 142.

Figure 6:
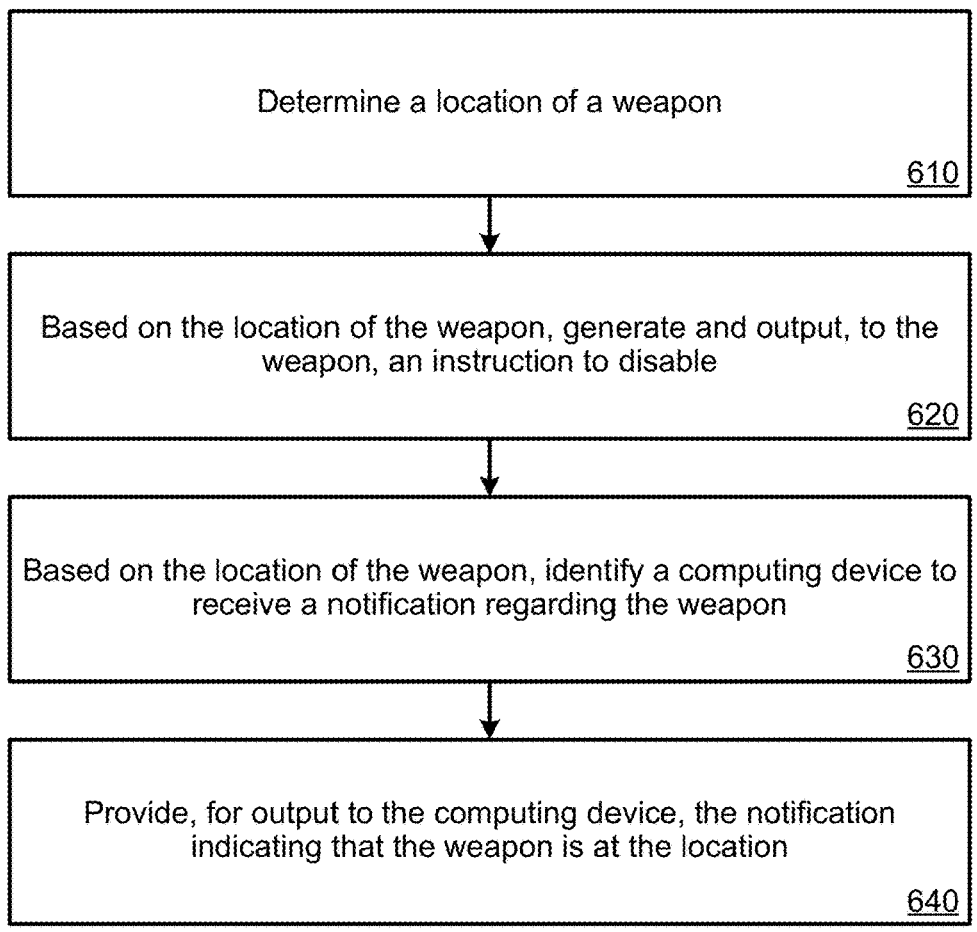
FIG. 6 is a flowchart of an example process for generating and outputting notifications based on the location of a weapon.

FIG. 6 is a flowchart of an example process 600 for generating and outputting notifications based on the location of a weapon. In general, the process 600 determines a location of a weapon. The process 600 generates and outputs an instruction to disable the weapon based on the location of the weapon. The process 600 identifies and notifies other computing devices that the weapon is in the location. The process 600 will be described as being performed by the server 106 of FIG. 1 and will include references to other components in FIG. 1. The process 400 may also be performed by the server 200 of FIG. 2.

The server 106 determines a location of a weapon 104 (610). The weapon 104 may include a communications interface 138 that allows the weapon 104 to communicate with the server 106. The server 106 may determine the location of the weapon based on GPS data received from the weapon 104, based on triangulation with base stations that are able to communicate with the weapon 104, and/or any other similar technique.

Based on the location of the weapon 104, the server 106 generates and outputs, to the weapon 104, an instruction to disable (620). The server 106 may determine what is located at the location. The server 106 may compare the location to the location data 116 that may store what is located at each location. The server 106 may compare the location to mapping data that includes what is located at each location. Another server may store the mapping data. A school, a government building, a stadium, a hospital, a residential building, a shooting range may be located at the location. Some of these entities and/or buildings may be a location where an enabled weapon may be too risky. For example, the school, a government building, a stadium, and/or a hospital may be locations where the weapon 104 should be disabled if the weapon 104 is located there and/or the predicted path of the weapon includes one of those locations. In this case, the server 106 may generate and output an instruction to disable the weapon 104. If the residential building and/or the shooting range is located at the location of the weapon 104 and/or the predicted path of the weapon 104, then the server 106 may bypass generating and outputting an instruction to disable the weapon 104.

Based on the location of the weapon 104 and/or based on outputting the instruction to disable the weapon 104, the server 106 identifies a computing device 158 to receive a notification 160 regarding the weapon 104 (630). The server 106 may include a notification manager 132 that is configured to generate and output notifications regarding the location and/or status of weapons. In some instances, a user may request to receive a notification if a weapon is in the vicinity of the particular location. In this case, the server 106 may generate and output a notification to that user indicating that the weapon 104 is at the particular location. In some instances, a user may request to receive a notification if a weapon is in the vicinity of the user. In this case, the server 106 may determine that the user 156 is in the vicinity of the weapon 104. The server 106 may generate and output a notification to the computing device 158 of the user 156 indicating that the weapon 104 is in the vicinity of the user 156.

The server 106 provides, for output to the computing devices 158 and 166, the notification 160 indicating that the weapon 104 is at the location (640). The notification may indicate a disabled status of the weapon 104. The server 106 may continuously monitor the location and/or the disabled status of the weapon 104 and generate and transmit an updated notification of the weapon 104 based on the location and/or the disabled status changing. The computing devices 158 and 166 may receive the notifications 160 and 168 and generate graphical interfaces 162 and 170. The computing devices 158 and 166 may output the graphical interfaces 162 and 170 on displays of the computing devices 158 and 166.

Figure 7:
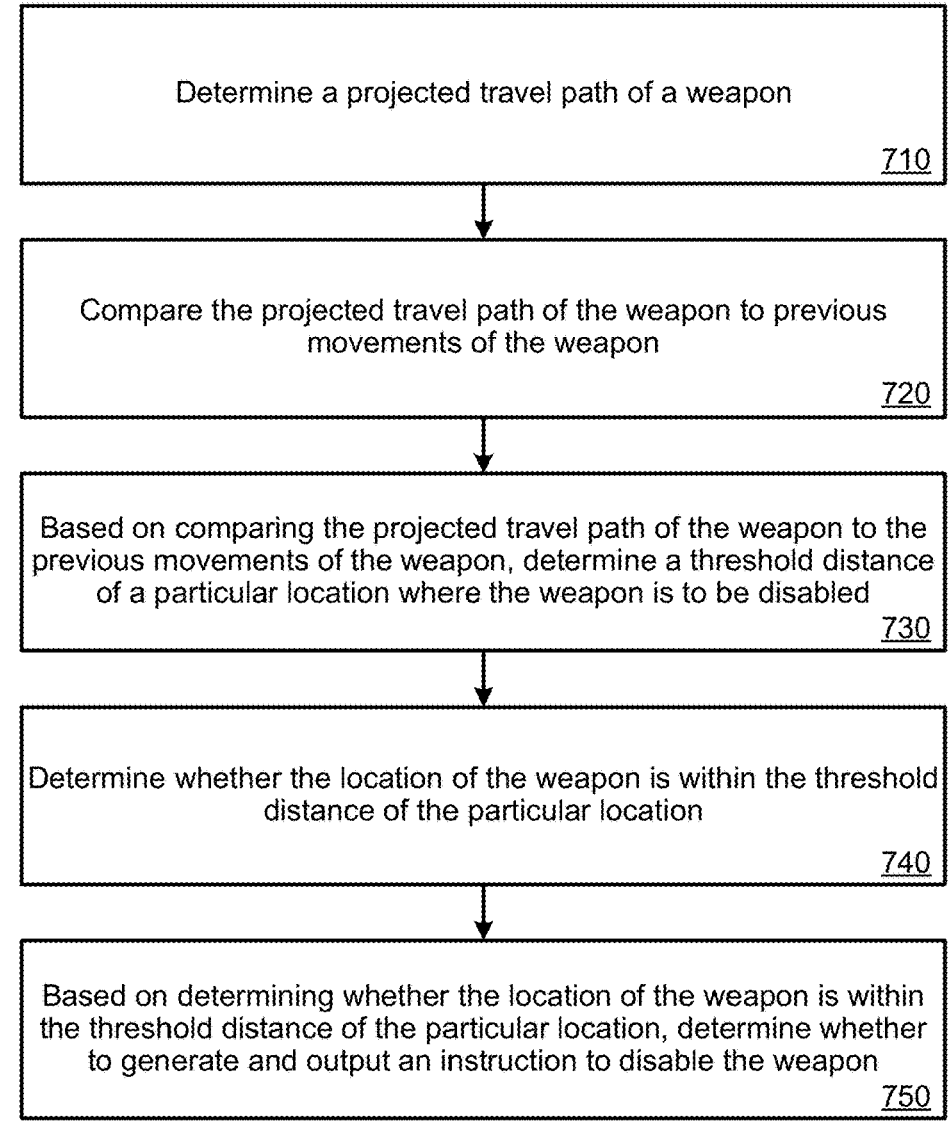
FIG. 7 is a flowchart of an example process for disabling a weapon based on current and past movement of the weapon.

FIG. 7 is a flowchart of an example process 700 for disabling a weapon based on current and past movement of the weapon. In general, the process 700 determines a projected travel path of a weapon and compares that projected travel path to past movement of the weapon. The process 700 determines to disable the weapon based on the projected travel path and past movement of the weapon. The process 600 will be described as being performed by the server 106 of FIG. 1 and will include references to other components in FIG. 1. The process 400 may also be performed by the server 200 of FIG. 2.

The server 106 determines a projected travel path of a weapon 104 (710). The server 106 determines the projected travel path of the weapon 104 based on the current location of the weapon 104, past movements of the weapon 104, mapping data, the date and time, and any other similar information. For example, if the weapon 104 has been moving at thirty-five miles per hour along a road with a speed limit of thirty miles per hour, then the projected travel path may indicate that the weapon 104 is likely to continue along that road at a similar speed. If the weapon 104 typically moves to a specific location on Saturday mornings, then the projected travel path may indicate that the weapon 104 is likely to continue to that specific location if the weapon 104 is moving on Saturday morning.

The server 106 compares the projected travel path of the weapon 104 to previous movements of the weapon 104 (720). The server 106 may determine that the projected travel path matches previous movements of the weapon 104. In this case, the server 106 may determine that there is not likely any anomalous behavior associated with the weapon 104. The server 106 may determine that the previous actions of the weapon 104 are likely to occur again. If the server 106 determines that the projected travel path does not match previous movements of the weapon 104, then the server 106 may determine that there may be anomalous behavior associated with the weapon 104.

Based on comparing the projected travel path of the weapon 104 to the previous movements of the weapon 104, the server 106 determines a threshold distance of a particular location 136 where the weapon 104 is to be disabled (730). If the projected travel path of the weapon 104 does not correlate with the previous movements of the weapon 104, then that may suggest that the user 102 may be taking action that the server 106 has not previously observed. In this case, the server 106 may select a larger threshold distance at which to disable the weapon 104 if the weapon approaches a particular location, such as the school 136. If the projected travel path of the weapon 104 does correlate with the previous movements of the weapon 104, then that may suggest that the user 102 may be taking action that the server 106 has previously observed. In this case, the server 106 may select a smaller threshold distance at which to disable the weapon 104 if the weapon approaches a particular location, such as the school 136. The server 106 may select this smaller threshold if the previous actions were identified as non-threatening, such as not discharging the weapon 104.

The server 106 determines whether the location of the weapon 104 is within the threshold distance of the particular location 136 (740). The server 106 monitors the location of the weapon 104 to determine whether the weapon is within the threshold distance of a particular location, such as the school 136. The threshold may be larger if the movement of the weapon 104 and the predicted path of the weapon 104 are similar to previous movements of the weapon 104. The threshold may be smaller if the movement of the weapon 104 and the predicted path of the weapon 104 are different than previous movements of the weapon 104. The server 106 may determine different threshold distances for different locations. For example, the school 136 may have one threshold distance and a stadium may have another threshold distance.

Based on determining whether the location of the weapon is within the threshold distance of the particular location, the server 106 determines whether to generate and output an instruction to disable the weapon 104 (750). If the server 106 determines that the weapon 104 is within the threshold distance of the particular location 136, then the server 106 may transmit an instruction to the weapon 104 to disable. If the server 106 determines that the weapon 104 is outside of the threshold distance of the particular location 136, then the server 106 may bypass transmitting an instruction to the weapon to disable. The server 106 may continuously monitor the location of the weapon 104. If the weapon 104 moves outside of the threshold distance of the particular location 136, then the server 106 may transmit an instruction to reenable the weapon 104.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
determining, by a weapon, that the weapon is in a particular location;
determining, by the weapon, a projected destination of the weapon and a projected travel path that the weapon will travel to reach the projected destination;
determining, by the weapon, a context of the weapon that includes a criminal history of the registered owner of the weapon, a purchase date of the weapon, a number of times and locations where the weapon was discharged, or identities of any previous owners of the weapon;
based on determining (i) that the weapon is in a particular location, (ii) the projected destination of the weapon and the projected travel path that the weapon will travel to reach the projected destination, and (iii) the context of the weapon that includes the criminal history of the registered owner of the weapon, the purchase date of the weapon, the number of times and locations where the weapon was discharged, or the identities of any previous owners of the weapon, determining, by the weapon, to disable the weapon; and
based on determining to disable the weapon, engaging, by the weapon, a mechanism of the weapon that is configured to disable the weapon.

2. The method of claim 1, comprising:
determining, by the weapon, that a computing device that is in the particular location;
generating, by the weapon, a notification indicating that the weapon is in the particular location; and
providing, for output by the weapon and to the computing device, the notification indicating that the weapon is in the particular location.

3. The method of claim 1, comprising:
receiving, by the weapon and from a computing device, data indicating a request to receive a given notification based on the weapon being in the particular location;
based on determining that the weapon is in the particular location, generating, by the weapon, a notification indicating that the weapon is in the particular location; and
providing, for output to the computing device and by the weapon, the notification indicating that the weapon is in the particular location.

4. The method of claim 1, comprising:
determining, by the weapon, that the weapon is no longer in the particular location;
based on determining that the weapon is no longer in the particular location, determining, by the weapon, to enable the weapon; and
disengaging, by the weapon, the mechanism of the weapon that is configured to disable the weapon.

5. The method of claim 1, comprising:
determining, by the weapon, that an additional weapon is in the particular location; and
based on determining that the additional weapon is in the particular location, bypassing, by the weapon, generating an additional instruction to disable the additional weapon.

6. The method of claim 5, comprising:
receiving, by the weapon, data indicating that the weapon is to be disabled based on the weapon being in the particular location; and
receiving, by the weapon, data indicating that the additional weapon is authorized to be enabled based on the additional weapon being in the particular location,
wherein disabling the weapon is based further on the data indicating that the weapon is to be disabled based on the weapon being in the particular location, and wherein bypassing generating the additional instruction to disable the additional weapon is further based on the data indicating that the additional weapon is authorized to be enabled based on the additional weapon being in the particular location.

7. The method of claim 1, comprising:
determining, by the weapon, that a computing device that is configured to capture audio, video, or image data is at the particular location;
based on determining that the weapon is in the particular location, generating, by the weapon, an instruction to capture audio, video, or image data; and
providing, for output by the weapon and to the computing device, the instruction to capture audio, video, or image data.

8. The method of claim 1, comprising:
comparing, by the weapon, previous movements of the weapon to the projected travel path that the weapon will travel to reach the projected destination,
wherein determining to disable the weapon is further based on comparing the previous movements of the weapon to the projected travel path that the weapon will travel to reach the projected destination.

9. The method of claim 1, wherein the context of the weapon comprises each of a registered owner of the weapon, the criminal history of the registered owner of the weapon, the purchase date of the weapon, the number of times and locations where the weapon was discharged, the identities of any previous owners of the weapon, and a current weather.

10. A weapon, comprising:
one or more processors; and
memory including a plurality of computer-executable components that are executable by the one or more processors to perform a plurality of actions, the plurality of actions comprising:
determining, by the weapon, that the weapon is in a particular location;
determining, by the weapon, a projected destination of the weapon and a projected travel path that the weapon will travel to reach the projected destination;
determining, by the weapon, a context of the weapon that includes a criminal history of the registered owner of the weapon, a purchase date of the weapon, a number of times and locations where the weapon was discharged, or identities of any previous owners of the weapon;
based on determining (i) that the weapon is in a particular location, (ii) the projected destination of the weapon and the projected travel path that the weapon will travel to reach the projected destination, and (iii) the context of the weapon that includes the criminal history of the registered owner of the weapon, the purchase date of the weapon, the number of times and locations where the weapon was discharged, or the identities of any previous owners of the weapon, determining, by the weapon, to disable the weapon; and
based on determining to disable the weapon, engaging, by the weapon, a mechanism of the weapon that is configured to disable the weapon.

11. The weapon of claim 10, wherein the actions comprise:
determining, by the weapon, that a computing device that is in the particular location;
generating, by the weapon, a notification indicating that the weapon is in the particular location; and
providing, for output by the weapon and to the computing device, the notification indicating that the weapon is in the particular location.

12. The weapon of claim 10, wherein the actions comprise:
receiving, by the weapon and from a computing device, data indicating a request to receive a given notification based on the weapon being in the particular location;
based on determining that the weapon is in the particular location, generating, by the weapon, a notification indicating that the weapon is in the particular location; and
providing, for output to the computing device and by the weapon, the notification indicating that the weapon is in the particular location.

13. The weapon of claim 10, wherein the actions comprise:
determining, by the weapon, that the weapon is no longer in the particular location;
based on determining that the weapon is no longer in the particular location, determining, by the weapon, to enable the weapon; and
disengaging, by the weapon, the mechanism of the weapon that is configured to disable the weapon.

14. The weapon of claim 10, wherein the actions comprise:
determining, by the weapon, that an additional weapon is in the particular location; and
based on determining that the additional weapon is in the particular location, bypassing, by the weapon, generating an additional instruction to disable the additional weapon.

15. The weapon of claim 14, wherein the actions comprise:
receiving, by the weapon, data indicating that the weapon is to be disabled based on the weapon being in the particular location; and
receiving, by the weapon, data indicating that the additional weapon is authorized to be enabled based on the additional weapon being in the particular location,
wherein disabling the weapon is based further on the data indicating that the weapon is to be disabled based on the weapon being in the particular location, and
wherein bypassing generating the additional instruction to disable the additional weapon is further based on the data indicating that the additional weapon is authorized to be enabled based on the additional weapon being in the particular location.

16. The weapon of claim 10, wherein the actions comprise:
determining, by the weapon, that a computing device that is configured to capture audio, video, or image data is at the particular location;
based on determining that the weapon is in the particular location, generating, by the weapon, an instruction to capture audio, video, or image data; and
providing, for output by the weapon and to the computing device, the instruction to capture audio, video, or image data.

17. The weapon of claim 10, wherein the actions comprise:
comparing, by the weapon, previous movements of the weapon to the projected travel path that the weapon will travel to reach the projected destination,
wherein determining to disable the weapon is further based on comparing the previous movements of the weapon to the projected travel path that the weapon will travel to reach the projected destination.

18. The weapon of claim 10, wherein the weapon includes a communications interface that is configured to communicate with a wireless carrier network.

19. One or more non-transitory computer-readable media of a weapon storing computer-executable instructions that upon execution cause one or more processors to perform acts comprising:
 determining, by the weapon, that the weapon is in a particular location;
 determining, by the weapon, a projected destination of the weapon and a projected travel path that the weapon will travel to reach the projected destination;
 determining, by the weapon, a context of the weapon that includes a criminal history of the registered owner of the weapon, a purchase date of the weapon, a number of times and locations where the weapon was discharged, or identities of any previous owners of the weapon;
 based on determining (i) that the weapon is in a particular location, (ii) the projected destination of the weapon and the projected travel path that the weapon will travel to reach the projected destination, and (iii) the context of the weapon that includes the criminal history of the registered owner of the weapon, the purchase date of the weapon, the number of times and locations where the weapon was discharged, or the identities of any previous owners of the weapon, determining, by the weapon, to disable the weapon; and
 based on determining to disable the weapon, engaging, by the weapon, a mechanism of the weapon that is configured to disable the weapon.

20. The media of claim 19, wherein the actions comprise:
 determining, by the weapon, that a computing device that is in the particular location;
 generating, by the weapon, a notification indicating that the weapon is in the particular location; and
 providing, for output by the weapon and to the computing device, the notification indicating that the weapon is in the particular location.

\* \* \* \* \*